UNITED STATES PATENT OFFICE.

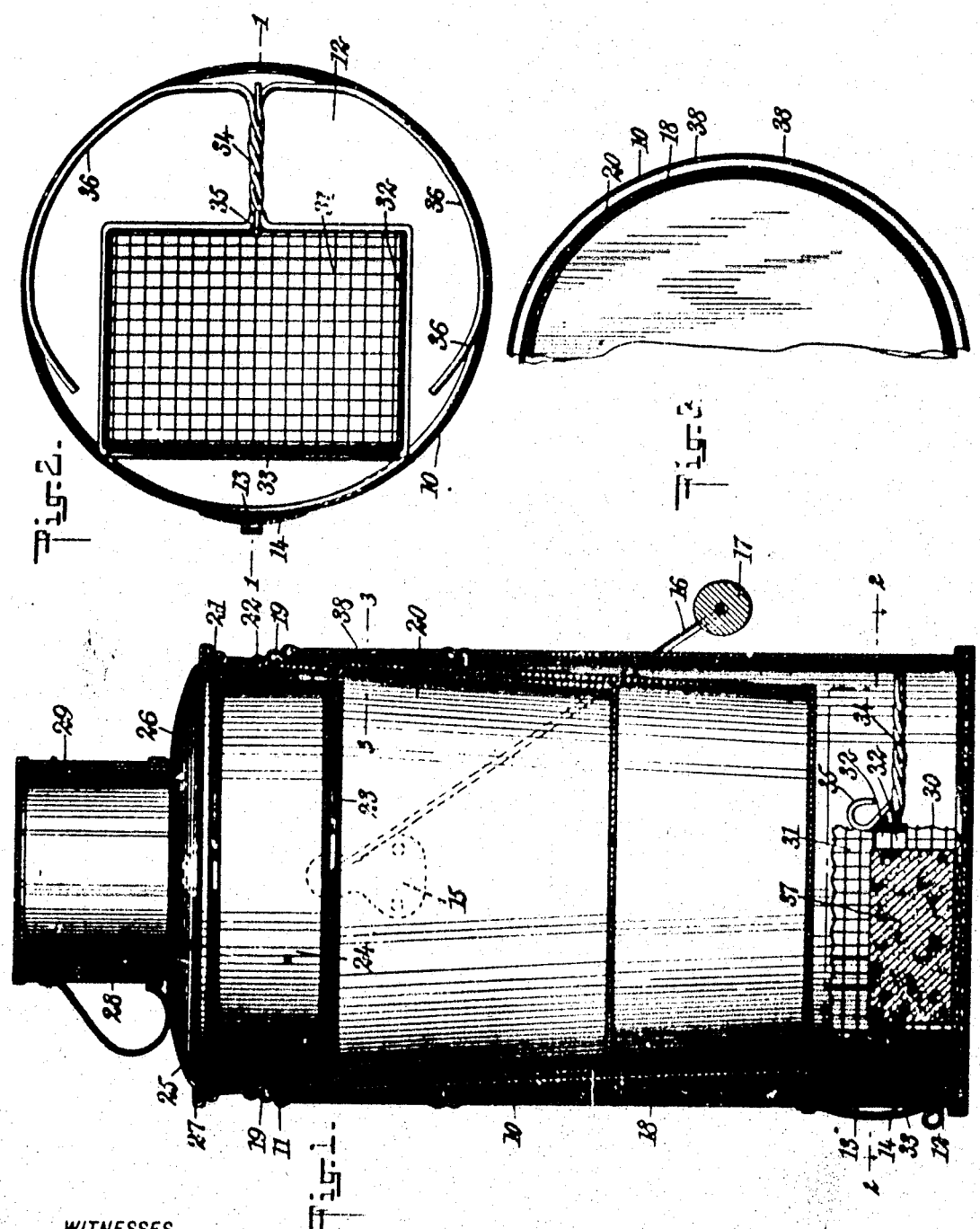

ARTHUR MERTON HUNT, OF HAMPDEN, MAINE.

DINNER-PAIL.

No. 929,949.   Specification of Letters Patent.   Patented Aug. 3, 1909.

Application filed May 12, 1908. Serial No. 432,401.

*To all whom it may concern:*

Be it known that I, ARTHUR MERTON HUNT, a citizen of the United States, and a resident of Hampden, in the county of Penobscot and State of Maine, have invented a new and Improved Dinner-Pail, of which the following is a full, clear, and exact description.

This invention relates to dinner pails, and more particularly to devices of this kind for carrying food and the like, which include a number of trays for liquid and solid contents and which have means for holding heat-supplying substances such as burning coke or charcoal, for maintaining the contents of the receptacles in a heated condition.

An object of the invention is to provide a simple, strong and durable dinner pail or other food receptacle, which is adapted for carrying liquid and solid food, which has trays of different sizes and forms for this purpose, and in which the contents can be maintained in a heated condition.

A further object of the invention is to provide a device of the class described having an outer casing or pail, trays nested therein, and a holder or brazier for charcoal, coke or the like within the pail, underneath the trays, the pail having a bottom of incombustible material such as asbestos, and being provided with vents to permit the escape of the gases of combustion, which, before leaving the pail, serve to warm the trays.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a vertical section of the device on the line 1—1 of Fig. 2; Fig. 2 is a transverse section on the line 2—2 of Fig. 1, showing the holder or brazier for the heat supplying substance; and Fig. 3 is a transverse section on the line 3—3 of Fig. 1, showing a part of the pail or outer casing and certain of the trays nested therein.

Before proceeding to a more detailed explanation of my invention, it should be clearly understood that the same can be fashioned from any suitable material, preferably sheet metal or the like, and that the details of construction can be varied to suit individual preference or special conditions.

The underlying principle of my invention resides in the provision of means for holding burning heat supplying substances, and the arrangement which permits the escape of the gases of combustion from the outer casing or pail, as well as in the arrangement of the trays nested in the pail, and the cover for the whole. The escape vents are so located that the gases of combustion, which are of course in a heated state, pass along the nested trays and thus serve to heat the latter and their contents. The holder or brazier for the charcoal, coke or the like is preferably formed from wire netting and has means engaging at the sides of the pail and serving to maintain the holder in position. At the bottom of the pail is provided a layer of incombustible material such as asbestos or the like, upon which the holder or brazier rests, and which prevents the direct contact of the burning substance with the bottom of the pail proper.

Referring more particularly to the drawings, I provide an outer casing or pail 10 which is preferably of cylindrical form and which, at the upper rim has a rib or bead 11. Inside of the pail and resting upon the bottom thereof is a second bottom or layer 12 of incombustible material such as asbestos. At the side, near the bottom, the pail has an opening 13 adjacent to which is pivoted a cover or lid 14 serving to close the opening and displaceable to permit the interior to be viewed and the condition of the burning heat supplying substance to be investigated. At the opposite sides, the pail has ears 15 at which are pivoted the ends of a bail 16 having a handle 17 by means of which the device can be conveniently carried. A tray 18 of circular cross section, tapered toward the bottom and provided at the upper rim with a bead or rib 19, is arranged within the pail. The bead 19 engages the bead 11 of the pail and limits the insertion of the tray into the latter. The arrangement is such that the bottom of the tray is held at a predetermined distance above the bottom of the pail, the distance being sufficient to permit the positioning there of the holder or brazier for the heat supplying substance, as is shown most clearly in Fig. 1.

Within the tray 18 is nested a second tray 20, suitably formed for the purpose and having at the upper rim a rib or bead 21, and underneath the same an outwardly disposed annular bead 22 formed to engage at the bead 19 to limit the insertion of the tray 20 into the tray 18. The tray 20 is preferably somewhat shallower than the tray 18, so that the bottoms of the tray are held separated. Underneath the bead 22, the tray 20 has an inwardly disposed annular bead 23, upon which seats a third shallow tray 24, likewise having at the upper rim an annular rib or bead 25. A cover 26 is carried by the tray 20 and has a laterally extended annular flange 27 which rests upon the rib or bead 21. The cover has a substantially cylindrical head 28 arranged to carry an inverted removable cup 29. The trays 18, 20 and 24 serve to hold food of different kinds within the dinner pail.

The holder or brazier comprises a lower section 30, and an upper section 31, fashioned from wire gauze or other perforated material and having at the adjacent edges, rims 32 of strip metal or the like. At a suitable point, the rims are movably connected by means of a hinge 33. A handle 34, fashioned from twisted wire or the like, is secured to the lower rim 32 by having the wires arranged thereabout and soldered or otherwise fastened in position. One of the wires is bent to form a catch 35 arranged to engage at the upper rim to hold the portions of the brazier together. At the outer extremity, certain of the wires forming the handle 34 are outwardly and laterally disposed to form keepers 36, adapted to engage at the sides of the pail to position the brazier and hold the same in place. The keepers have a certain resiliency which adapts them particularly well for this purpose. The holder or brazier is formed to contain a block 37 of coke, charcoal or the like, which when in a state of combustion maintains the contents of the pail in a heated condition. Near the upper rim of the pail are vents 38, through which the gases of combustion from the burning heat-supplying substance can escape, and, passing along the outer tray 18, thus serve to heat the nested trays. A certain draft will be established between the opening 13 and the vents 38, to assist the combustion. The draft can be controlled by means of the cover 14.

Having thus described my invention, I claim as new, and desire to secure by Letters Patent:

1. A dinner pail comprising a casing, a tapering tray arranged in said casing and engaging at the upper rim only thereof, a second tapering tray arranged in said first tray and engaging below its rim at the rim of said first tray, a further tray arranged within said second tray and cylindrical in form, whereby said further tray engages at its lower edge within said second tray and is spaced therefrom except at its lower edge, a cover extending into said second tray between the same and said further tray, said cover engaging at the rim of said second tray, and a heating device in said casing under said first tray, provided with spring clamping members for engaging the inner surface of said casing.

2. A dinner pail comprising a casing having a bottom of incombustible material, and near the upper rim a tapering tray arranged in said casing and engaging at the upper rim only thereof, a second tapering tray arranged in said first tray and having below its rim a bead engaging at the rim of said first tray, said second tray having under the bead thereof a second bead, a further tray of uniform cross section arranged in said second tray and resting upon said further bead, whereby a space is formed between said second tray and said further tray, said casing and said trays having beads at the rims, a cover extending into the space formed between said second tray and said further tray and engaging at the rim of said second tray, and a heating device in said casing under said first tray, provided with a pair of arc-shaped spring clamping members arranged to lie along the inner surface of said casing, said spring members having inwardly turned ends.

3. A dinner pail comprising a casing having upper and lower openings and a bottom of incombustible material, a plurality of nested trays spaced apart from said casing to provide a heat conduit, a brazier disposed within said casing and provided with a handle, and a pair of arc-shaped spring clips forming integral extensions of said handle arranged to frictionally engage the inner surface of said casing for centering and holding said brazier rigidly in position.

In testimony whereof I have signed my name to this specification in the presence of two subscribing witnesses.

ARTHUR MERTON HUNT.

Witnesses:
HENRY W. MAYO,
AUSTIN W. SNARE.